United States Patent
Stanley et al.

(10) Patent No.: US 8,053,031 B2
(45) Date of Patent: Nov. 8, 2011

(54) TWO-PART EPOXY COMPOSITION

(75) Inventors: David L. Stanley, Sperry, OK (US); David J. Dunn, Aurora, OH (US)

(73) Assignee: Raven Lining Systems Inc., Broken Arrow, OK (US)

( * ) Notice: Subject to any disclaimer, the term of this patent is extended or adjusted under 35 U.S.C. 154(b) by 0 days.

(21) Appl. No.: 11/881,235

(22) Filed: Jul. 26, 2007

(65) Prior Publication Data

US 2009/0029059 A1 Jan. 29, 2009

(51) Int. Cl.
*B05D 3/02* (2006.01)

(52) U.S. Cl. .......................................... 427/386; 528/87

(58) Field of Classification Search .................. 427/386; 528/87

See application file for complete search history.

(56) References Cited

U.S. PATENT DOCUMENTS

| | | | |
|---|---|---|---|
| 3,394,025 A | 7/1968 | McCune | |
| 3,655,122 A | 4/1972 | Brown et al. | |
| 4,002,599 A * | 1/1977 | Graham | 528/99 |
| 4,556,580 A | 12/1985 | Kamuro et al. | |
| 4,966,790 A | 10/1990 | Iizuka et al. | |
| 5,202,160 A | 4/1993 | Schuppe et al. | |
| 5,230,842 A | 7/1993 | Munde | |
| 5,340,652 A | 8/1994 | Sondhe et al. | |
| 5,407,978 A | 4/1995 | Bymark et al. | |
| H1439 H | 5/1995 | Hairston | |
| 5,621,025 A | 4/1997 | Toerner et al. | |
| 5,656,703 A | 8/1997 | Costin et al. | |
| 5,895,797 A | 4/1999 | Hayashihara et al. | |
| 5,973,075 A | 10/1999 | Gagne et al. | |
| 6,015,625 A | 1/2000 | Morizono et al. | |
| 6,107,370 A | 8/2000 | Bowlin | |
| 6,632,541 B2 | 10/2003 | Johoji et al. | |
| 6,841,212 B2 | 1/2005 | Bicakci-Jenkins et al. | |
| 7,009,003 B2 | 3/2006 | Cruz | |
| 2003/0073770 A1 | 4/2003 | Klemarczyk et al. | |
| 2005/0250886 A1 | 11/2005 | Stoeppelmann et al. | |
| 2005/0257848 A1 | 11/2005 | Funatsu et al. | |
| 2006/0223933 A1 | 10/2006 | Rubinsztajn | |

FOREIGN PATENT DOCUMENTS

| | | |
|---|---|---|
| DE | 10054504 A1 | 5/2002 |
| EP | 0178729 A1 | 4/1986 |
| EP | 0353086 A2 | 1/1990 |
| EP | 0369071 A1 | 5/1990 |
| EP | 1371684 A1 | 12/2003 |
| JP | 58-193775 A | 11/1983 |
| JP | 03-186695 | 8/1991 |

(Continued)

OTHER PUBLICATIONS

International Searching Authority, International Preliminary Report on Patentability, Feb. 4, 2010, The International Bureau of WIPO.

*Primary Examiner* — Dah-Wei Yuan
*Assistant Examiner* — Robert S Walters, Jr.
(74) *Attorney, Agent, or Firm* — McDonald Hopkins LLC

(57) ABSTRACT

A two-part epoxy composition is provided that comprises a first part having a mixture of an epoxy resin and an anhydride, and a second part having a curing agent. Also provided is a method for making a substantially bis-α-glycol free epoxy resin for two-part epoxy compositions, and a method for applying a two-part epoxy composition to a system of water piping.

23 Claims, 1 Drawing Sheet

FOREIGN PATENT DOCUMENTS

| | | |
|---|---|---|
| JP | 04208279 A | 7/1992 |
| JP | 04-358568 | 12/1992 |
| JP | 06-337089 | 12/1994 |
| JP | 2000336242 A | 12/2000 |
| JP | 2005008884 A | 1/2005 |
| JP | 2005-319418 | 11/2005 |
| JP | 2006110793 A | 4/2006 |
| JP | 2006306900 A | 11/2006 |
| RU | SI9620121 | 2/1999 |
| RU | 2184304 | 6/2002 |
| WO | WO 94/26830 | 11/1994 |
| WO | WO 99/63016 | 12/1999 |
| WO | WO 00/77094 | 12/2000 |
| WO | WO02/48234 * | 6/2002 |
| WO | WO 2004/094890 A2 | 11/2004 |
| WO | WO 2006/085494 A1 | 8/2006 |
| WO | WO 2007/007725 A1 | 1/2007 |

* cited by examiner

TWO-PART EPOXY COMPOSITION

FIELD OF THE INVENTION

The present invention relates in general to two-part epoxy compositions and a process for making and using the same.

BACKGROUND OF THE INVENTION

All types of pipes, such as water pipes, gas pipes, sewer pipes, industrial fuel, and chemical manufacturing plant pipes are susceptible to build-up of material on the inner surface of the pipe. The build-up may be a result of corrosion of the pipe surface, rust, or deposits from the material flowing through the pipe onto the pipe surface, such as lime. Such build-up leads to a narrowing of the pipe diameter, reduction of the throughput, and the formation of pits, which ultimately jeopardizes the pipe integrity and leads to premature failure of the pipe system.

Unfortunately, the replacement of pipes is not necessarily a suitable solution to such problems. One possible alternative is renovating the existing pipes, which reduces the need for a complete or partial replacement of a piping system. The interior of the pipe may be coated with an adhesive resin, such as an epoxy resin, to remedy such problems. An epoxy resin is typically made by reacting a dihydric phenol, such as bisphenol A, with excess epichlorohydrin in the presence of an alkali metal hydroxide, such as sodium hydroxide.

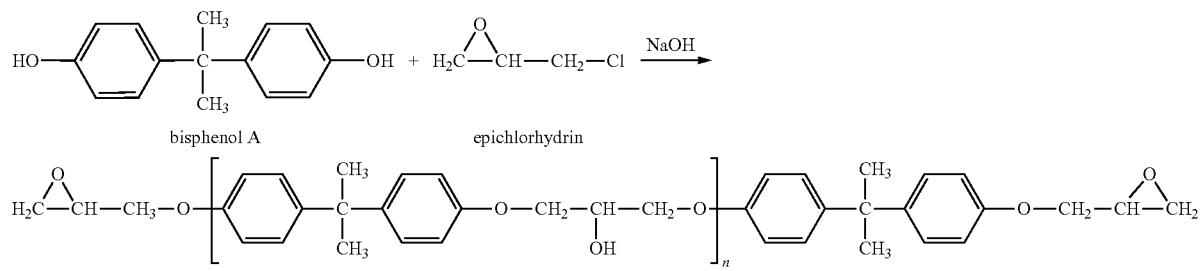

bisphenol A            epichlorhydrin

Typically, the resulting resin predominantly contains the diglycidyl ether of the dihydric phenol, with minor quantities of oligomer and or resin that is terminated by α-glycol groups. The dihydric phenol and the diglycidyl ether may be represented by Formula 1:

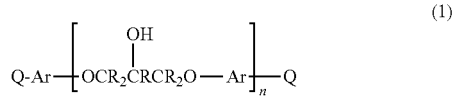
(1)

where Ar represents an aromatic group. When Formula 1 represents the dihydric phenol, each Q is a hydroxyl group. When Formula 1 represents a digycidyl ether, Q is a gylcidyl ether moiety represented by Formula (2):

(2)

Each R represents a hydrogen atom, a halogen or a lower alkyl group. "n" represents a number of repeating units. "n" may be up to about 25 in liquid epoxy resin. Typically, a small percentage of the glycidyl ether moieties (2) are hydrolyzed during this process to make α-glycol groups, which are generally represented by formula (3).

$$—OCR_2CR(OH)—CR_2(OH)$$  (3)

Both mono-α-glycol containing resin (in which one Q is a glycidyl ether moiety of Formula (2) and the other Q is an α-glycol of Formula (3)) and bis-α-glycol containing resin (in which both Q are α-glycol moieties of Formula (3)) may be formed. Therefore, hydroxyl groups in epoxy resins are present from many sources, including the backbone of bisphenol A diglycidyl ether ("BADGE"), mono-α-glycols, and bis-α-glycol. Such hydroxyl groups are frequently cited as accelerators for curing resins.

Usually, the mono-α-glycol resin is not detected upon curing, as it reacts during the curing process. However, bis-α-glycol is an undesirable impurity present after curing. Bis-α-glycol can be detected by analysis of water extracts from epoxy can coatings and epoxy coatings for potable water pipes and tanks. Bis-α-glycol is not normally detected in cold water extraction tests but is detected when extraction is done with water at about 82° C. (180° F.) and higher, which is commonly referred to in the plumbing and water industry as "commercial hot water."

SUMMARY OF THE INVENTION

In one aspect, the present invention is directed to a two-part epoxy composition comprising a first part comprising a mixture of a diglycidyl ether of a dihydric phenol and an anhydride and a second part comprising a curing agent.

In another aspect, the present invention is directed to a process for making a substantially bis-α-glycol free epoxy resin for two-part epoxy compositions comprising the steps of mixing an epoxy resin and an anhydride at room temperature, and reacting until substantially all of the bis-α-glycol is converted.

In a further aspect, the present invention is directed to a process for coating a system of water piping comprising the steps of mixing a first part comprising an epoxy resin and an anhydride and a second part comprising a curing agent to form a two-part epoxy composition, coating the system with the composition, and curing the composition.

DETAILED DESCRIPTION OF THE PREFERRED EMBODIMENTS

Figure 1:
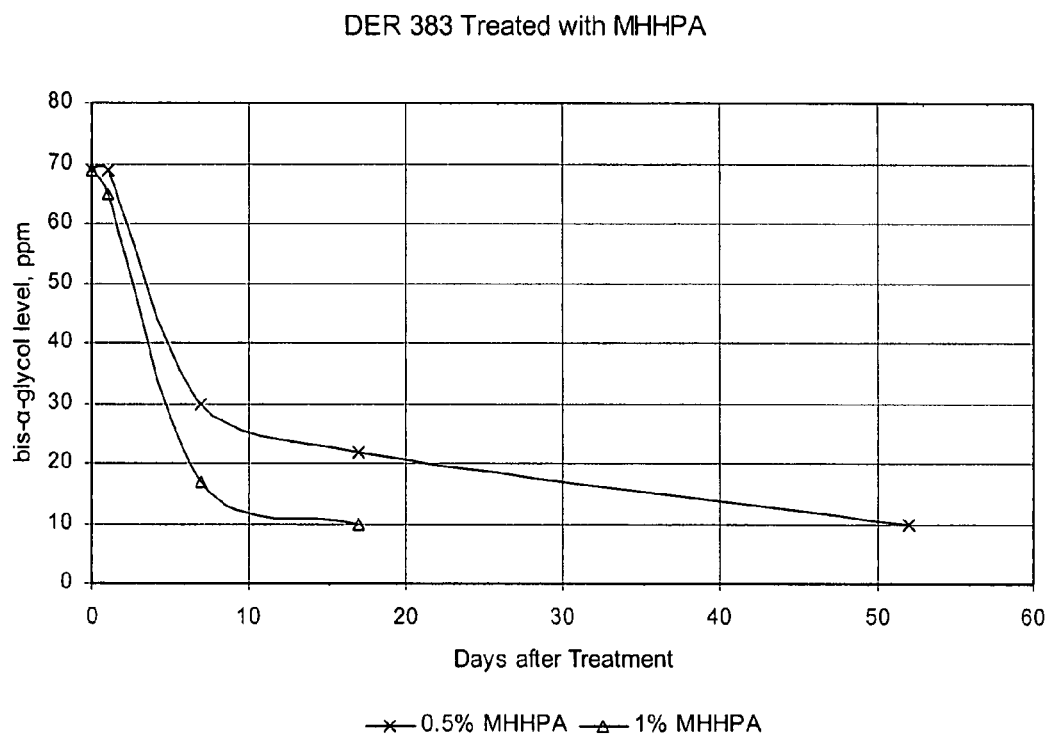
FIG. 1 shows a chart identifying a decrease of bis-$\alpha$-glycol after treating an epoxy resin with an anhydride.

While the present invention is described with reference to preferred embodiments described herein, the present invention is not limited to such embodiments but are merely illustrative of the present invention and do not limit the scope of the invention as claimed.

A two-part epoxy composition that is substantially free of bis-$\alpha$-glycol is provided. The present two-part epoxy composition includes a first part comprising a mixture of an epoxy resin and an anhydride and a second part comprising a curing agent. The anhydride is compatible with various epoxy resins and substantially destroys bis-$\alpha$-glycol without negatively impacting the curing time. The resulting epoxy composition may be mixed with a curing agent and applied to water piping systems including but not limited to hot water systems.

To reduce the level of bis-$\alpha$-glycol, an anhydride is mixed with the epoxy resin. The reaction of the anhydride with the hydroxyl groups of bis-$\alpha$-glycol is an acetylation reaction. Generally, however, acetylation is carried out in the presence of catalysts that react with oxirane groups in epoxy resins and decrease its reactivity. It has been found that, by adding anhydride to an epoxy resin at room temperature without catalysts, the bis-$\alpha$-glycol level may be reduced to less than 10 ppm without decreasing the reactivity of the epoxy resin. It is understood that the anhydride may be any anhydride that is soluble in an epoxy resin and may be added to the resin in an amount sufficient to destroy the bis-$\alpha$-glycol, but not enough to begin curing the epoxy resin. In one embodiment, the anhydride may be present up to about 5% by weight. In another embodiment, the anhydride may be present from about 0.5% to about 1.0% by weight. Non-limiting illustrative examples of suitable anhydrides include methylhexahydropthalic anhydride ("MHHPA") and methyltetrahydrophthalic Anhydride ("MTHPA").

The anhydride may be mixed with various epoxy resins. In one embodiment, the base epoxy resin may be a BADGE type resin, a blend of BADGE type resins, or a blend of bisphenol A resin and epichlorohydrin.

The epoxy resin may also include a modifier such as, for example, a diluent. The diluent may be used in an amount sufficient to lower the viscosity of the epoxy resin to an appropriate number and will, therefore, depend upon the base resin used. The amount of the diluent added will also depend upon the amount appropriate for the addition of any pigmentation. In some embodiments, diluents may be unreacted plasticizers and/or mono-functional epoxy resins.

Optionally, the two-part epoxy composition may also comprise extender pigments, coloring pigments, or both. Extender pigments are inorganic powder materials such as calcium carbonate, magnesium carbonate, silica, silica alumina, glass powder, glass beads, mica, graphite, barium sulfate, aluminum hydroxide, talc, kaolin, acid clay, activated clay, bentonite, diatomaceous earth, montmorillonite, dolomite, etc.

Inorganic coloring pigments may include titanium oxide, zinc white, carbon black, iron oxide red, cadmium red, titanium yellow, chrome oxide green, cobalt green, ultramarine, Prussian blue, cobalt blue, cerulean blue, cobalt violet, mars violet, etc., and usable organic coloring pigments may include permanent red, Hansa yellow, benzidine yellow, lake red, phthalocyanine blue, phthalocyanine green, etc.

Furthermore, additives such as defoamers, leveling agents, antifoam, wetting agents, and thixotropic agents, may also be included in the composition.

The curing agent may be one or more curing agents such as aliphatic and aromatic amines, cycloaliphatic amines, mercaptans, polyamides, amido-amines, amine adducts, and mixtures thereof. Illustrative examples of mercaptan curing agents are mercaptan terminated polysulfides. Illustrative examples of aromatic and aliphatic curing agents are methylenedianaline, diaminodiphenylsulphone, aromatic polyamine adducts based on methylenedianiline, modified aromatic adducts based on methylenedianiline and modified methylenedianiline, m-phenylendiamine, its adducts and derivatives, and polyamines, alkyl and heterocyclic amines, and their adducts and derivatives.

In one illustrative embodiment, the first part of a two-part epoxy may comprise one or more epoxy resins, anhydrides, diluents, mineral fillers and/or pigments, and other additives. In one embodiment, the epoxy resin may be present up to about 60%, the anhydride present up to about 8%, the diluents may be present up to about 15%, the mineral fillers and/or pigments may be present up to about 45%, and other additives may be present up to about 5% by the weight of the first part. In another embodiment, the epoxy resin may be present from about 50% to about 60%, the anhydride up to about 2%, the diluents may be present from about 5% to about 15%, the mineral fillers and pigments from about 30% to about 40%, and other additives up to about 2% by weight of the first part. It is understood, however, that one of ordinary skill in the art will appreciate the use of various components and amounts for the first part.

The second part may comprise one or more curing agents, mineral fillers, and other additives. In one embodiment, the curing agent may be present up to about 55%, the mineral fillers may be present up to about 60%, and other additives may be present up to about 10% by the weight of the second part. In another embodiment, the curing agent may be present from about 40% to about 50%, the mineral fillers from about 45% to about 55%, and other additives up to about 5% by weight of the second part. It is understood, however, that one of ordinary skill in the art will appreciate the use of various components and amounts for the second part.

The two-part epoxy coating composition may be prepared by mixing the first part with the second part. The coating composition is then applied onto the surface of a substrate, such as the inner surface of a hot water pipe or the surface of any hot water system, by a conventional method such as spraying or brushing. Application of the composition to the inner surface of the hot water pipe may be carried out by spraying the composition over the inner surface. In one embodiment, the coating composition may be applied to the inner surface of a hot water pipe by blowing the coating composition through the inside of the pipe with compressed air or other gas. In some embodiments, the compressed air (and/or the pipe) may be heated to increase both the curing rate and the bis-$\alpha$-glycol reduction rate. In some embodiments, the compressed air (and/or the pipe) may be heated to about 38° C. It is understood, however, that higher and lower temperatures may be used, as required by the particular application.

EXAMPLES

The following non-limiting examples set forth below were prepared in accordance with the invention and are intended to merely illustrate the invention.

Three epoxy coating compositions were formulated. The first composition (control sample) was formulated with an epoxy resin without an anhydride, and the second and third were formulated with an epoxy resin treated with 1% MHHPA. Each sample was allowed to age for 14 days prior to formulation with the curing agent. The epoxy-resins were each mixed with a curing agent, and steel panels were coated with the coating compositions to a thickness of 10 milli-inches ("mils"). The first and second samples were then allowed to cure at a temperature of 22° C. for 5 hours. The third sample was allowed to cure at a temperature of 38° C. for 1 hour followed by 4 hours at 22° C. After curing, the samples were flushed with 82° C. tap water for 15 minutes at a rate of 3-5 gallons per minute. The samples were then submerged in a fixed volume of pH 8 extraction water inside a sealed glass bottle and placed in an 82° C. oven for 24 hours.

The extraction water was then analyzed for the bis-α-glycol impurity using HPLC with UV detection. The analysis was repeated after the samples were immersed for 2, 7, 10, and 14 days, with the extraction water being replaced with fresh pH 8 water 24 hours before each sampling date. This procedure follows the test methods described in ANSI/NSF Standard 61 for potable water components. As shown in Table 2, the water sample generated by the second sample (epoxy resin treated with 1% MHHPA and cured at 22° C. for five hours) contained only 56 ppb bis-α-glycol after 7 days, whereas the water sample of the untreated composition contained 199 ppb bis-α-glycol after 7 days. The third sample (epoxy resin treated with 1% MHHPA and cured at 38° C. for one hour and 22° C. for four hours) was below the detection limit of 10 ppb after 7 days.

TABLE 1

|  | Control Sample (Untreated Epoxy) ppb | Second Sample with 1% MHHPA at 22° C. ppb | Third Sample with 1% MHHPA at 38° C. ppb |
| --- | --- | --- | --- |
| Day 1 | 639 | 100 | 19 |
| Day 2 | 526 | 100 | 20 |
| Day 7 | 199 | 56 | <10 |
| Day 10 | — | 47 | — |
| Day 14 | 134 | — | — |

Typically, untreated epoxy resins contain about 30 ppm to about 80 ppm bis-α-glycol. To demonstrate the decrease of bis-α-glycol concentration over time in an epoxy resin after mixing with an anhydride, two bisphenol-A liquid epoxy resins (DER 383 from Dow Chemical Company) were treated at room temperature with 0.5% and 1.0% MHHPA, respectively. Samples were taken periodically until the bis-α-glycol content was below the detection limit of about 10 ppm. FIG. 1 illustrates the decrease of the bis-α-glycol concentration over time in the resins treated with MHHPA. As shown in FIG. 1, the resin containing 1% MHHPA reached a bis-α-glycol concentration of less than 10 ppm in about 17 days and the resin containing 0.5% MHHPA reached a bis-α-glycol concentration of less than 10 ppm in about 52 days. It is understood, however, that faster rates of bis-α-glycol concentration disappearance can by achieved by increasing the temperature of the mixture.

In addition, two epoxy coating compositions were formulated to demonstrate that the addition of an anhydride to an epoxy resin to remove the bis-α-glycol has a negligible effect on the curing of the coatings. A control sample was formulated with an epoxy resin without an anhydride, and the second composition was formulated with an epoxy resin treated with 1% MHHPA. The gel time was tested for each composition using standard test methods for gel time of reacting thermosetting resins (ASTM D-2471). As shown in Table 2, there was no appreciable difference between the control sample and the second composition containing the MHHPA. In addition, the set time, tack free time, and dry hard times are identical. Accordingly, the addition of an anhydride to an epoxy resin has a negligible effect on the curing of the coatings.

TABLE 2

|  | Control Sample | Epoxy Resin Treated with 1% MHHPA |
| --- | --- | --- |
| 200 grams gel time (mins) | 36 | 33 |
| Set to Touch Time (hrs) | 1.5 | 1.5 |
| Tack Free Time (hrs) | 3.0 | 3.0 |
| Dry Hard Time (hrs) | 4.0 | 4.0 |

The invention has been described above and, obviously, modifications and alterations will occur to others upon a reading and understanding of this specification. The claims as follows are intended to include all modifications and alterations insofar as they come within the scope of the claims or the equivalent thereof.

What is claimed is:

1. A two-part epoxy composition comprising a first part comprising about 95-99.9% by weight of an epoxy resin and about 0.1-5% by weight of an anhydride, said anhydride being capable of reacting to said epoxy resin at about room temperature so said first part is substantially bis-α-glycol free, having a bis-α-glycol concentration of less than 10 ppm, and a second part comprising a curing agent, wherein said two-part epoxy composition is capable of curing at a temperature of up to about 40° C.

2. The two-part epoxy composition of claim 1, wherein said epoxy resin is a diglycidyl ether of a dihydric phenol.

3. The two-part epoxy composition of claim 2, wherein said dihydric phenol is bisphenol A.

4. The two-part epoxy composition of claim 1, wherein said anhydride is methylhexahydrophthalic anhydride.

5. The two-part epoxy composition of claim 1, wherein said curing agent is selected from the group consisting of amines, cycloaliphatic amines, amine adducts, mercaptans, polyamides, and amido-amines.

6. The two-part epoxy composition of claim 1, wherein said curing is capable of occurring at about room temperature.

7. The two-part epoxy composition of claim 1, further comprising an additive wherein said additive is selected from the group consisting of pigments, thixotropic agents, defoamers, mineral fillers, leveling agents, antifoam, wetting agents, and diluents.

8. The two-part epoxy composition of claim 7, wherein said second part comprises said curing agent about 40-50% by weight, said mineral fillers from about 45% to about 55% by weight, and other additives up to about 5% by weight.

9. The two-part epoxy composition of claim 1, wherein the first part to said second part ratio is about 1:1 to about 10:1 by weight.

10. The two-part epoxy composition of claim 1, wherein the first part has no more than about 10 parts per million bis-α-glycol.

11. A process for coating a system of water piping comprising the steps of:
 a) mixing a first part comprising an epoxy resin and about 0.1-8% by weight of an anhydride, and a second part comprising a curing agent to form a two-part epoxy composition, said first part being reacted at about room temperature so that it is substantially bis-α-glycol free, having a bis-α-glycol concentration of less than 10 ppm;

b) coating said system with said composition; and c) curing said composition at up to about 40° C.

12. The process of claim 11, wherein said epoxy resin is a diglycidyl ether of a dihydric phenol.

13. The process of claim 12, wherein said dihydric phenol is bisphenol A.

14. The process of claim 11, wherein said anhydride is methyl methylhexahydrophthalic anhydride.

15. The process of claim 11, further comprising the step of heating said composition after coating said system.

16. The process of claim 15, wherein said curing step is at about room temperature.

17. A process for making an epoxy resin substantially bis-α-glycol free for two-part epoxy compositions comprising the steps of:

c) mixing an epoxy resin and about 0.1-8% by weight of an anhydride at room temperature to form a mixture; and d) reacting said mixture at about room temperature until said mixture is substantially free of bis-α-glycol, having a bis-α-glycol concentration of less than 10 ppm.

18. The process of claim 17, wherein said epoxy resin is a diglycidyl ether of a dihydric phenol.

19. The process of claim 18, wherein said dihydric phenol is bisphenol-A.

20. The process of claim 17, wherein said anhydride is methylhexahydrophtalic anhydride.

21. The process of claim 17, wherein an additive is further included in said mixing step.

22. The process of claim 21, wherein said additive is selected from the group consisting of pigments, thixotropic agents, defoamers, mineral fillers, leveling agents, antifoam, wetting agents, and diluents.

23. The process of claim 17, further comprising the step of applying heat of up to about 40° C. to cure said mixture.

* * * * *